March 19, 1957 E. P. BENTLEY 2,785,573
GAS-FLOATED GYROSCOPES
Filed June 2, 1955

INVENTOR.
Edward P. Bentley
BY Martin Kilpatrick
atty

United States Patent Office 2,785,573
Patented Mar. 19, 1957

2,785,573
GAS-FLOATED GYROSCOPES

Edward P. Bentley, Waltham, Mass., assignor to Protocorp, Inc., Waltham, Mass., a corporation of Massachusetts Application June 2, 1955, Serial No. 512,725

13 Claims. (Cl. 74—5)

This invention relates to gyroscopes, and more particularly, to novel indicating or control gyroscopes wherein the rotating gyroscopic element is floated in a pressurized gaseous medium.

The support of the rotating elements of indicating or control gyroscopes has long been a problem, particularly in the case of physically small and light weight gyroscopes for use in aircraft. Various types of mountings have been used from time to time, for example, low friction bearings, but such mechanical suspensions were subject to both friction and shifts of position due to necessary tolerances in their construction. Hence, highly accurate tolerances had to be maintained for even minimum acceptability as to precession, for example. Spring mounting helped reduce the positional errors, but itself imposed restrictions.

The floating of the rotating element in a liquid has provided a substantial advance in the art, but not without limitations. Particularly, the relatively large values of viscous drag caused by the supporting liquid not only caused torque which resulted in undesirable precession, but the large variations in such drag with temperature caused rapid changes in the dynamic response of the gyroscope with temperature. The density of the liquid also varied with temperature. Since a relatively small change in density was sufficient to destroy the accuracy of the flotation balance, a change in temperature caused mechanical loads on the centering or support members and produced what amounted to a mechanically supported gyroscope with its known problems as pointed out above. Further temperature effects were caused by the heat generated in the usual electrical drive system located at the center of the gyroscope structure, since the heat had to escape through the liquid layer and, in doing so, caused temperature variations which were difficult to control. In short, although thermostat control was essential in these liquid flotation systems, even the complexity and weight of a thermostat control system did not, as a practical matter, provide the degree of temperature control desired.

I have discovered that by floating the rotating element of a gyroscope in a gaseous medium, the frictional forces and positional errors inherent in mechanical supports and the problems of temperature regulation in liquid suspensions are eliminated. I have also discovered that such flotation can be accomplished with substantially neutral buoyancy by pressurizing the gaseous medium to increase its density to a value substantially equal to that of the rotating gyroscopic element.

Furthermore, since the density of the gas, rather than its pressure, determines its flotation power, a compressible gas contained at constant volume will maintain constant density despite temperature changes. Thus, one of the major variables inherent in liquid flotation systems is completely eliminated. The other main variable, viscosity, will change with temperature, but the overall viscosity of a gas is from 10 to 100 times less than that of a liquid, and also the viscosity change with temperature is relatively low, since the viscosity of a gas increases with temperature increase approximately as the square root of the absolute temperature, whereas the viscosity of a liquid increases logarithmically with temperature decrease. Thus, thermostat control, with its complication and expense, is not necessary at all in many applications, and in cases when it is needed, thermostat control error is of much less importance.

Thus in my novel gyroscope, an outer pressure container is provided having therein a pressurized gaseous medium, with the rotating gyroscopic element floated in said pressure medium within the outer container. The gyroscopic element itself may consist of a thin-walled hollow element preferably of spherical shape and having therein a pressurized gaseous medium of sufficiently lower density than that of the gaseous medium in the outer container to float the gyroscopic element with neutral buoyancy. Alternatively, a solid inner element of low density material, such as lithium, glass or quartz, may be used, and such construction will eliminate swirl effects of the gaseous medium within the inner element.

A wide variety of gases or mixtures of gases may be used as the gaseous pressure medium. Relatively inert gases are particularly desirable, such as nitrogen, and hydrogen, for example, for the outer container and the inner element, respectively, although other gases could be used. The density of the gas is of some importance, gases of high molecular weight such as xenon and krypton being particularly useful in supporting solid inner elements, and gases of low molecular weight, such as helium and hydrogen being particularly useful in filling a hollow inner element. In general, the requirements of the gas are that it exist in the gaseous state over a desired temperature range, say from —65° F. to 165° F. for aircraft use and a pressure range, say from 1,000 p. s. i. to 60,000 p. s. i., preferably at a temperature above its critical temperature, so that no change to liquid or solid phase will occur which will affect the viscous drag so as to alter its rate of change with temperature, and so affect calibration. Also, it is important that the gaseous medium does not diffuse through the walls of the outer container or inner element under conditions of use.

It should be noted that even though an inner pressurized hollow element be used, the neutral buoyancy of the inner element will not be affected by change in temperature with a resulting change in pressure, since, in accordance with the well-known laws governing the behavior of gases, as long as the volumes of gas in the outer container and inner element remain constant, the density of the gas in the inner element and that in the outer container will remain constant. Thus, no thermostat control is required to avoid pressure changes, since the neutral buoyancy of the inner element is not affected by pressure changes.

Such a gas floated gyroscope can be used as a rate gyroscope or as a free gyroscope somewhat similarly to the known liquid floated gyroscopes wherein the inner sphere has mounted therein a rotating element, but without their most serious limitations and disadvantages. It is, however, particularly adapted for use in a structure wherein both the inner element and the outer container are rotated, so that the driving mechanism is removed from the sensitive portions of the gyroscope. If the outer container is mounted in gimbals, it becomes the rough gyro and the inner element the sensitive gyro and problems such as accuracy of mounting, heating, and the supplying of power to the inner rotating element do not arise. If the outer container is mounted directly on a vehicle, the inner element becomes a semi-free gyro which may be restrained in the horizontal plane to provide a directional indicator or control if desired. Also, the unit as a whole is inherently shock and vibration resistant.

The various objects and features of my invention will become apparent from the following description of preferred embodiments thereof, together with the accompanying drawings wherein.

Figure 1:
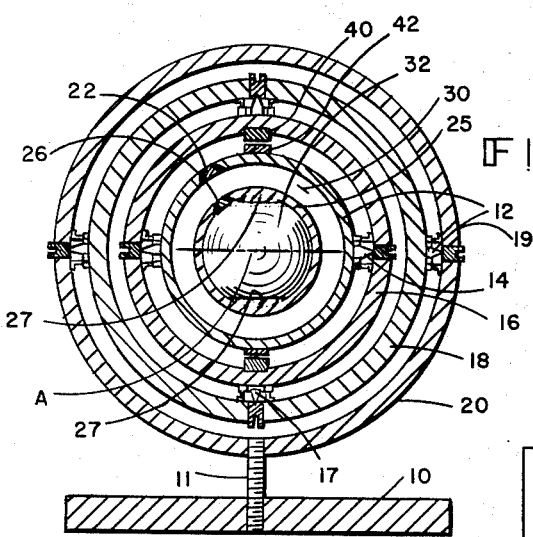
Fig. 1 is a cross-sectional view of a gyroscope structure according to my invention wherein a spherical outer container is mounted in gimbals and a pressurized hollow inner sphere is employed as the inner gyroscopic element.
Figure 2:
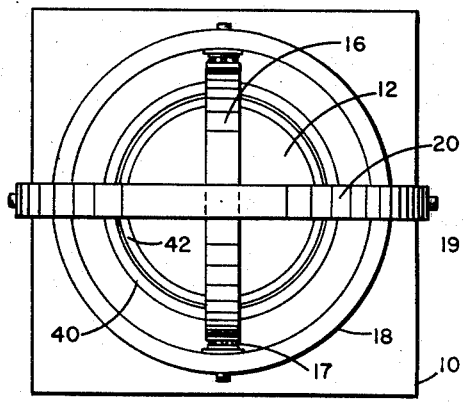
Fig. 2 is a plan view of the gyroscope structure of Fig. 1.

Referring to the drawings, an outer sphere 12 forming the pressure container of my novel gyroscope is mounted within a gimbal system by its bearings 14, so that it may be rotated within said system about an axis A which may remain fixed in space. The gimbal system itself comprises three rings; an inner ring 16 mounting bearings 14, a middle ring 18, and an outer ring 20 with bearings 17 between the inner and middle rings, and bearings 19 between the middle and outer rings. Outer ring 20 is mounted on a base 10 by an upstanding member 11.

The outer sphere 12 has a suitable closure 22 therein through which it may be filled with a suitable gaseous medium 30, for example, nitrogen, to a pressure of 13,500 p. s. i to provide a density of about 0.403 gm./cc. within said sphere. A sufficiently strong container for such pressures may be provided by the use of stainless steel or other high strength material. When using stainless steel, for example, a sphere of 2.2 cm. inside diameter will have a wall thickness of 0.2 cm.

The inner gyroscopic element comprises a hollow sphere 25 floated at neutral buoyancy in the pressurized gaseous medium in the outer sphere 12, such inner sphere being itself pressurized to about 13,500 p. s. i. with a gaseous medium 32, such as hydrogen, to provide a density (0.033 gm./cc.) less than that within the outer sphere (0.403 gm./cc.) so that the average density of the inner sphere is low enough to be substantially equal to that of the gaseous medium 30. The inner sphere 25 may conveniently be of light magnesium-aluminum alloy weighing about 2 gm./cc., of about 2 cm. inside diameter with a wall thickness of 0.07 cm. and with a somewhat heavier portion 27 around its equator to establish its principal axis of inertia A. Thus, the average density of the inner sphere can readily be made equal to that of the gaseous medium 30 of the outer pressure container. The wall thickness of the inner sphere 25, although relatively thin, is under little or no stress due to pressure differential, except possibly during assembly.

Figure 3:
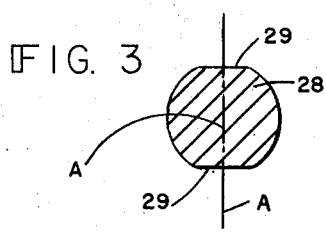
Fig. 3 is a cross-sectional view of a solid inner spherical element.

A solid spherical element 28 having its principal axis of inertia A defined by flattened pole portions 29 (Fig. 3) may also be provided by using a light weight material such as lithium (0.534 gm./cc.) and using a high molecular weight gas such as xenon or krypton as the gaseous medium 30, for example.

The inner sphere may be assembled within the outer sphere and the unit pressurized by any one of a number of methods. Thus, the inner sphere, if solid, may simply be assembled within two hemispherical halves of the outer sphere 12, such halves welded together, and the outer sphere pressurized with a suitable gas through a closure 22. With a hollow inner sphere 25 as above described, the unpressurized inner sphere may be assembled as before within the outer sphere by welding the two hemispherical halves thereof together. The two spheres may then be pressurized simultaneously through their closures, the closure 22 of the outer sphere 12 being large enough to permit pressurizing the inner sphere 25 by a suitable nozzle fitting its closure 26, while simultaneously permitting filling of the outer sphere. Other filling methods may be used. For example, the spheres may be filled with the gaseous medium in its liquid phase below its critical temperature, or gas diffusion may be utilized by suitable choice of metals and gaseous filling media, by allowing the pressurized gaseous medium to diffuse through the walls of the sphere at elevated temperature. The closures 22 and 26 may be of any of a number of suitable high pressure seals or valves. For example, the well-known tapered metal to glass seals may be used.

Many of the great variety of gyroscope operating elements such as driving motors, displacement indicating means, and centering devices, all well known, particularly in the liquid flotation gyroscope art, may be used with my novel pressurized gas floated gyroscope, and such elements may be selected in accordance with the particular type of gyroscope structure desired for a given use.

Thus, the inner sphere 25 may be rotated by rotating the outer sphere 12 and relying either upon the viscous drag of the gaseous medium to bring the inner sphere 25 up to an operating speed in the range of about 5,000–20,000 R. P. M., or positive driving means may be provided for engaging the inner sphere during its acceleration to operating speed. For rotating the outer sphere, an air turbine or electric motor may be used. In the embodiment herein shown, an electric motor is provided, comprising a stator 40 mounted on inner gimbal ring 16 at its equator relative to the axis of the outer sphere 12, and a rotor 42 mounted on outer sphere 12 at its equator. The rotor 42 is preferably of a type that does not require electrical connections. The stator winding 40 may be supplied with operating current from any suitable source of electrical power (not shown). Although viscous drag provides suitable starting in many instances, positive mechanical connections such as friction locks and dogs, which may be actuated by centrifugal force or otherwise for automatic engagement and disengagement at a desired operating speed, may be useful in some applications. Alternatively, the outer and inner spheres may not themselves rotate but the inner sphere may have mounted within it a rotating gyroscopic element.

Figure 4:
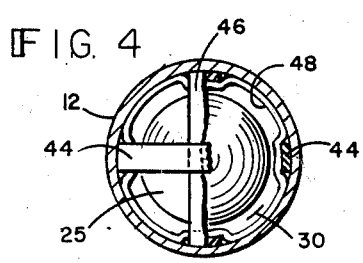
Fig. 4 is a diagrammatic view of a centering means for the inner element.

It is usually desirable to provide means for centering the inner sphere within the outer sphere. This may be accomplished for example, by means of eddy currents, electro or permanent magnets, or by electrostatic means. As herein shown (Fig. 4), it is accomplished by creating eddy currents in inner sphere 25 by providing three coils 44, 46 and 48 arranged on the inner surface of outer sphere 12 about mutually perpendicular axes to repel inner sphere 25, the latter being of conductive material in such case, such as the magnesium-aluminum alloy or lithium above noted, for carrying the eddy currents. Still other centering means could be used, even mechanical means, or the use of the buoyancy of the inner sphere and pressure gradients set up in the dynamic system to center the inner sphere perpendicular to the axis of spin. Stabilization along the spin axis might then be achieved by using a magnetic inner sphere and either permanent magnets along the spin axis or a coil around the equator, outside of the outer sphere in each case. Even heat can be used for centering by heating one side of the outer sphere and not the other in order to move the inner sphere away from the source of heat. Servo and other feedback centering means may also be employed. In any event, extremely small forces are necessary for centering the inner sphere whatever the means for providing such forces, since the mass of the inner sphere is substantially supported by the pressurized gaseous medium 30.

The angular displacement between the axes of the inner and outer spheres may be measured in a variety of ways, by either electromagnetic, electrostatic, or optical means.

Figure 5:
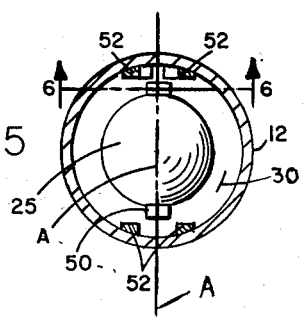
Figs. 5 and 6 are diagrammatic views of a means for detecting misalignment of the axes of the inner element and outer container.
Figure 6:
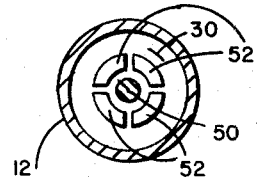

Herein (Figs. 5 and 6) the inner sphere 25 is provided with ferrous pole pieces 50 on its spin axis. Segmented coils 52 mounted on the inner surface of outer sphere 12 are used as angular displacement measuring means by suitable electrical means for measuring the inductance of each of the four segments of each of said coils, which inductance will vary in accordance with the displacement of ferrous pole pieces 50 on the spin axis of the inner sphere. By the use of such coils at each pole, any direct sideways movement of the inner sphere can be cancelled out and the system made sensitive only to angular displacement. If desired, signals of direct sideways movement can be used to center the inner sphere through suitable systems such as are above described.

The displacement may also be measured optically. Thus, a surface may be flattened on the inner sphere and the deflection of a beam of light reflected therefrom may be measured. This will require a transparent section in the outer sphere, which can be provided by the use of a glass window sealed by metal to the outer sphere.

The electromagnetic type of angular displacement measuring device is also particularly adapted for applying correcting torques to the inner sphere as well as for measuring its displacement. Thus, by suitable servo loops, torques proportional to displacement may be provided, by which means a linear system may be achieved. By providing the outer sphere with similar angular displacement measuring devices, displacements may be used to correct undesired precession of the outer sphere.

In operation, the inner sphere 25 is spun by spinning outer sphere 12 about its axis A by its motor 40, 42. The inner sphere 25 then slowly comes up to speed due to the viscous drag of the gaseous medium 30, and rotates about an axis the same as that of the outer sphere 12. Since the inner sphere 25 is mechanically independent of the outer sphere, it will tend to continue rotating with its axis fixed in space, and will remain centered because of the eddy current repulsion effect of current passing through the centering coils. Thus, if the outer sphere be displaced, any angular displacement of the inner sphere relative thereto can be detected by the angular displacement measuring devices and such measurement can be used to apply correcting torque to the outer sphere if desired. Any displacement of the outer sphere and its gimbal system relative to base 10 can be detected by similar means.

Thus it will be seen that I have provided a novel gyroscope system wherein the gyroscopic element is floated in a pressurized gaseous medium whereby thermostat control is eliminated for most applications and torque effects due to viscous and other drag are much reduced. Various modifications of this concept within the spirit of the invention and the scope of the appended claims will be apparent to those skilled in the gyroscope art.

I claim:

1. In a gyroscope, a pressure container, a pressurized gaseous medium within said container, and a gyroscopic element floating at neutral buoyancy in said medium.

2. In a gyroscope as claimed in claim 1, further including means for rotating said element.

3. In a gyroscope as claimed in claim 1, further including means for centering said element within said container.

4. In a gyroscope as claimed in claim 1, further including means for sensing angular displacement of said element.

5. In a gyroscope, an outer pressure container, a pressurized gaseous medium having a pressure of at least 1000 p. s. i. within said container, and a gyroscopic element floating in said medium spaced from the walls of said pressure container, the density of said gyroscopic element being substantially the same as that of said gaseous medium to float said element at neutral buoyancy in said medium.

6. In a gyroscope as claimed in claim 5, wherein said gyroscopic element comprises a hollow sphere having therein a pressurized gaseous medium of lower density than that of said gaseous medium in said pressure container, the average density of said sphere being substantially the same as that of said gaseous medium in said pressure container.

7. In a gyroscope as claimed in claim 5, wherein said gyroscopic element is a solid sphere.

8. In a gyroscope, a base, an outer pressure container rotatably mounted on said base, a pressurized gaseous medium within said container, a gyroscopic element floating at neutral buoyancy in said medium spaced from the walls of said container, means for centering said element within said container, means for spinning said outer pressure container about an axis to spin said gyroscopic element about an axis, and means for detecting the displacement of said axes.

9. In a gyroscope as claimed in claim 8, wherein said base includes gimbal means.

10. In a gyroscope, an outer spherical pressure container, a pressurized gaseous medium having a pressure of at least 1000 p. s. i. within said container, a spherical gyroscopic element floating at neutral buoyancy in said medium and concentric with said container, and means for spinning said outer container.

11. In a gyroscope, a base, an outer pressure container rotatably mounted on said base, a pressurized gaseous medium having a pressure of at least 1000 p. s. i. within said container, a gyroscopic element floating at neutral buoyancy in said medium and spaced from the walls of said container free of mechanical support therefrom, and means for spinning said outer pressure container about an axis to spin said gyroscopic element about an axis.

12. In a gyroscope as claimed in claim 11 including means for centering said element within said container.

13. In a gyroscope as claimed in claim 11 including means for detecting the relative displacement of said axes.

References Cited in the file of this patent

UNITED STATES PATENTS

| | | |
|---|---|---|
| 1,180,815 | Anschutz-Kaempfe | Apr. 25, 1916 |
| 1,589,039 | Anschutz-Kaempfe | June 5, 1926 |
| 2,393,473 | Jones | Jan. 22, 1946 |
| 2,613,538 | Edelstein | Oct. 14, 1952 |